United States Patent [19]

Nelson

[11] Patent Number: 4,757,929

[45] Date of Patent: Jul. 19, 1988

[54] CAR RACK

[76] Inventor: Norman Nelson, 1563 Baseline Rd., Ottawa, Ontario, Canada, K2C 0B4

[21] Appl. No.: 91,775

[22] Filed: Sep. 1, 1987

[51] Int. Cl.$^4$ ............................................... B60R 9/00
[52] U.S. Cl. .................................... 224/329; 224/322; 224/320
[58] Field of Search ............... 224/309, 320, 321, 322, 224/329, 330, 331, 337

[56] References Cited

U.S. PATENT DOCUMENTS

| 2,888,178 | 5/1959 | Olsen | 224/329 |
| 4,101,061 | 7/1978 | Sage et al. | 224/322 |
| 4,684,049 | 8/1987 | Maby et al. | 224/320 X |

FOREIGN PATENT DOCUMENTS 220510 9/1958 Australia ............................. 224/329

Primary Examiner—Henry J. Recla
Assistant Examiner—David Voorhees

[57] ABSTRACT

A car rack comprises an elongated support bar adapted to be disposed above the roof or trunk of a vehicle and a pair of support members mounted to said bar and moveable towards or away from each other. The support members being adjustable in distance to accommodate vehicles of different widths. The support members having gripping means to engage and hold on to selected structures on or adjacent to the roof or trunk of the vehicle. The support bar contains the tensioning and release mechanism which is comprised of a fixed elongated toothed ratchet element and a tooth engaging movable pawl in a sliding sleeve which in turn is connected to a tensioning cable to which when pressure is applied exerts biased forces on to the attached gripping means thereby clamping and locking them and the support members in engagement with the selected structures of the roof or trunk of the vehicle.

7 Claims, 4 Drawing Sheets

CAR RACK

FIELD OF INVENTION

The present invention relates to a adjustable car rack which can be secured to vehicles of various widths. By using a simple sliding tensioning mechanism the car rack can be installed in seconds and locked in position while standing on one side of the vehicle only.

PRIOR ART OF THE INVENTION

Several types of car racks are known in the prior art. Some of them are adjustable like the present one.

For example, U.S. Pat. No. 4,354,625 describes a car top carrier, wherein a pair of adjustable telescoping supports is attached to mounting pads through castings. The carrier is adjusted to the appropriate width through a knob rotatable lead screw interconnecting the two elements.

U.S. Pat. No. 4,449,656 discloses a luggage rack comprising concentrically positioned portions which are displaceable in relation to each other for allowing adjustment of the length of the support rod and thus allowing the rack to be adapted to the width of the vehicle. The rack has a locking device for securing the portions of the support rod in a desired relative position. The locking device has two complementary securing means which secure the end portions of the rack in relation to the intermediate portion. Each locking device consists of a block positioned in the intermediate portion which can be secured in the desired position by means of a bolt which extends through the block and engages the intermediate portion. A spring is mounted on the block and a portion of the rod and is pressed to disengage the end portion from the intermediate one.

SUMMARY OF THE INVENTION

The present invention provides a car rack which can quickly and easily be adjusted to accommodate vehicles of various widths, and can be secured by simple single handed action once the rack has been adjusted for the width of the vehicle.

Accordingly, there is provided a car rack including an elongated support bar which is adapted to be disposed above the roof or trunk of the vehicle and which extends laterally thereof. A pair of support members are mounted to the said bar and are moveable towards or away from each other. The support members have gripping means associated therewith to engage and hold on to selected structures on or adjacent to the the roof or trunk of the vehicle when the gripping means are biased towards each other.

The rack further comprises a tensioning and release mechanism which is comprised of a fixed elongated toothed ratchet element and a moveable tooth engaging pawl which in combinaton with a tensioning cable which is attached to the gripping means so that when pressure is applied to the tensioning unit biased forces are applied to the gripping means thereby clamping and locking them to the roof edge or rain gutter.

A feature of the preferred embodiment of the invention is that the toothed ratchet element and the sliding tensioning element containing the tooth engaging pawl is housed inside the support bar.

A further feature is that the slideable tensioning means has a gripping knob or handle secured to it for tightening the mechanism to secure the rack in place, and that the tooth engaging pawl has a finger grip extension opposite its ratchet engaging end, this exits through a hole in the sliding element along with the handle support pin. An elongated aperture in the support bar allows for the sliding movement.

DESCRIPTION OF THE DRAWINGS

The present invention will be better understood through the following detailed description of the preferred embodiment in conjunction with the accompanying drawings, in which.

DETAILED DESCRIPTION

Figure 1:
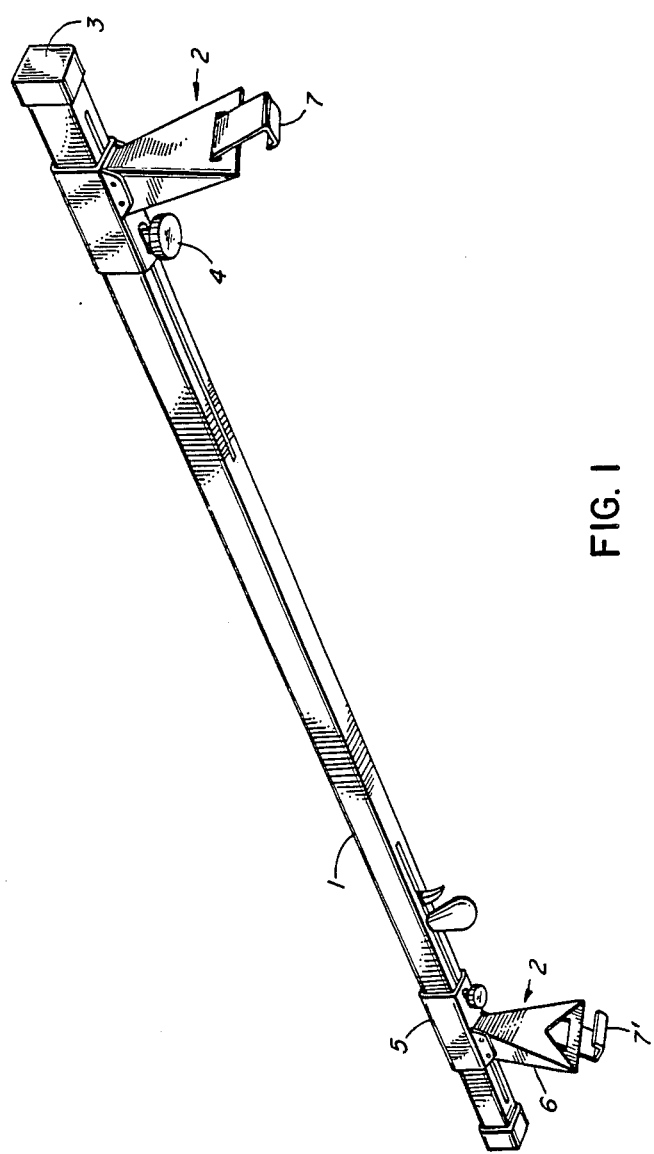
FIG. 1 is a perspective view of a car rack according to the present invention.
Figure 2:
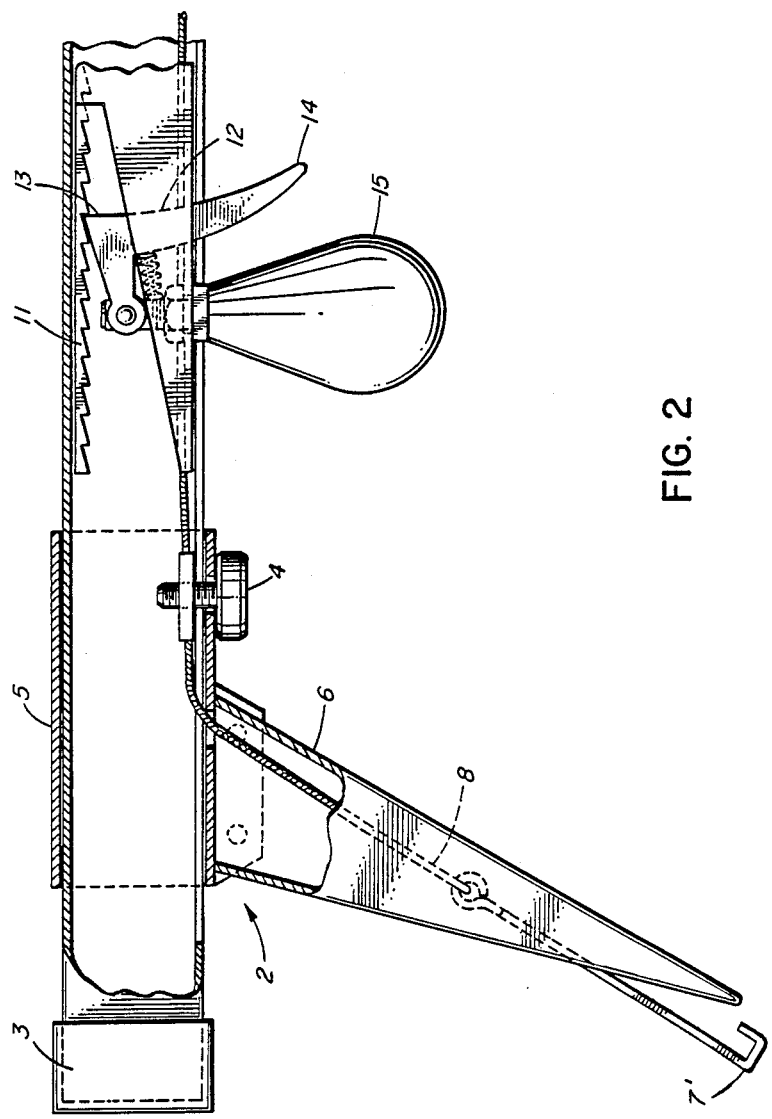
FIG. 2 is an enlarged view of apart of the rack shown in FIG. 1 with a portion cut away to show the interior structure.
Figure 4:
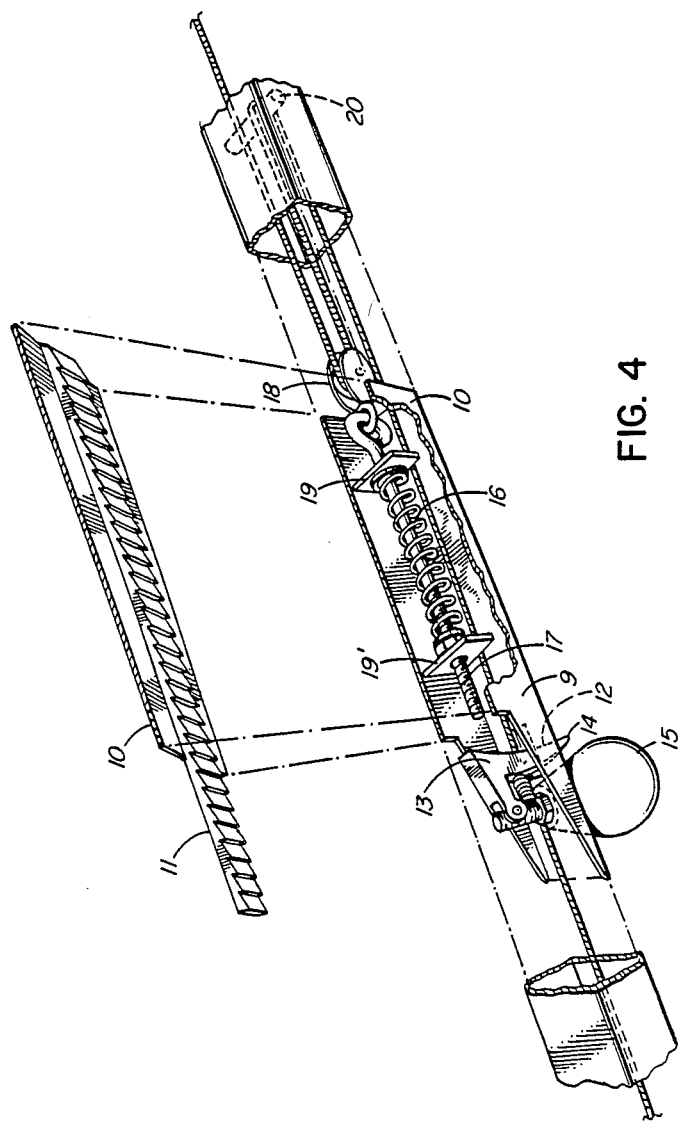
FIG. 4 is an enlarged view of the locking mechanism.
Figure 3:
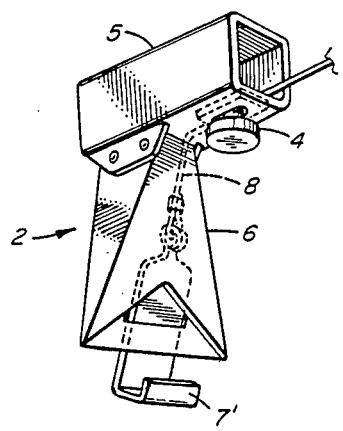
FIG. 3 is a perspective view of the end supports with a portion cut away to show the interior structure.
Figure 5:
FIG. 5 is an illustrative view of the cable mechanism.

As shown in FIG. 1, a car rack comprises an elongated support bar 1, a pair of support members 2 and 2' and a pair of removeable end covers 3 secured to either end of the support bar.

Figure 6:
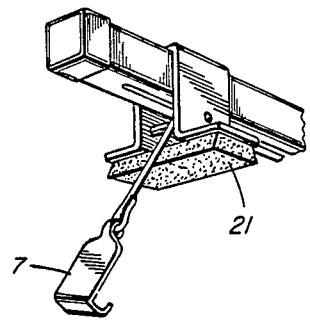
FIG. 6 is a perspective view of an alternative arrangement for support of the rack.

The support members are mounted on the support bar and are moveable towards or away from each other enableing the rack to be used on vehicles of various widths. Once the support members are in the desired position they are secured in place by means of a threaded assembly and a small knob 4 which is tighened by hand. Each support member is comprised of a sleeve 5 which is mounted on the support bar and a leg 6 which extends transversely therefrom. In an alternative embodiment, shown in FIG. 6 the support member comprises a sleeve and a rubber pad 21.

The support members are fastened to the vehicle by means of gripping members 7 and 7' which are adapted to engage either the lower side of the rain gutter, or to engage the channel inside the doors of vehicles. The gripping members are connected to each other by means of a cable 8.

To ensure that the support members are securely fastened to the vehicle, the rack is provided with a locking mechanism 9. The locking mechanism comprises a sleeve 10 which is shaped so as to be slideable within the support bar, an elongated toothed ratchet element 11 is mounted inside on the upper face of the support bar and above the area where the sleeve operates. A spring activated pawl 12 is placed inside the sleeve 10. The pawl has an engagement tooth 13 at one end and at the other end a release trigger 14. The release trigger protrudes to the outside of the support bar through an opening provided in the sleeve 10 and through an elongated aperture located on the underside of the support bar. A handle 15 is releaseably secured to the pawl unit 12 through means such as a screw, the handle is secured to the sleeve by a threaded nut on the inside, a hole is provided in the sleeve 10 allow for the passage of the handle 15 and the trigger 14 to the outside of the support bar through an elongated aperture. A compression spring 16 is mounted on a threaded guide 17 which is connected to a single pulley 18. The spring 16 is retained in position on the guide 17 and is situated between the two blocks 19 and 19' which are fixed to the sleeve 10. The cable 8 is attached to the gripping member 7 and then passes through the support member 2 and along the support bar 1 interior. It forms a loop around the pulley 18 then a second loop around a sheave 20 which is fixed inside the support bar 1. The cable 8 then passes through the sleeve 10 passing under the blocks 19 and 19' and continues on to the other support member 2' where it is attached to the gripping member 7'.

In operation a car rack is placed on the top of car, the support members 2 and 2' are moved towards or away from each other depending on the width of the car. They are then secured to the support bar 1 by tightening the knobs 4. The rack is now ready to be secured to the vehicle. With the supports standing on the gutters the operator pulls the handle 15 this in turn causes the tension sleeve 10 to move within the support bar 1. A distinct clicking sound is heard as the pawls tooth 13 which is spring activated is passing along the toothed ratchet element 11. As the handle is pulled the slack on the cable is taken up pulling the gripping members 7 and 7' coming in contact with the rain gutters, the final pressure is applied to the handle 15 it is enough to cause the spring 16 to be compressed against the block 19 with the pawls tooth moving to its final place in the ratchet element where it stays until released, the rack is now secured to the vehicle. To remove the rack from the vehicle the pressure is taken off the pawl 12 by pulling on the handle 15 and at the same time pulling the trigger 14 to its second position in which the tooth 13 on the pawl disengages from the ratchet element 11. With the release trigger 14 depressed the handle 15 can now be returned to a relaxed position. The tension on the cable 8 eases and spring 16 resumes its relaxed state and the gripping members 7 and 7' are then disengaged and the rack can be lifted from the car.

In another embodiment, the rack comprises an elongated cylindrical support bar and all elements of said rack are modified accordingly.

The amount of movement of the support members to accommodate the width of various vehicles is of course relative to the distance the tension sleeve 10 is able to traverse inside the support bar 1. If the toothed ratchet element 11 can accommodate 6 inches of movement laterally then it follows that each support member 2 and 2' can be moved 6 inches giving a total expansion of one foot which in most cases is ample. In any case a longer support bar 1 and cable 8 can be substituted.

The embodiments of the invention in which an exclusive property or privilege is claimed are defined as follows:

1. A car rack including an elongated support bar adapted to be disposed above the roof or trunk of the vehicle and to extend generally laterally thereof; a pair of support members mounted adjacent the ends said bar and movable towards or away from each other, said support members having gripping means associated therewith to engage and hold on to the selected structures on or adjacent to the roof edge or trunk lid edge of the vehicle when the gripping means are biased towards each other; slideable tensioning and release means on said bar including a ratchet and pawl mechanism, said ratchet and pawl mechanism including an elongated toothed ratchet element attached to said bar a slidable tensioning member slidably mounted on said bar adjacent said ratchet element has been inserted and a toothed gripping pawl attached to said slideable tensioning member, said toothed gripping pawl being engagable with said ratchet element, which in combination with a tensioning cable having opposing ends connected to each said gripping means, a pulley connected to said slidable tensioning member, a pin connected across said bar at an intermediate location thereof, said cable having a first intermediate loop extending around said pin and a second intermediate loop extending through said pulley whereby when said tensioning member is slid in said bar, biasing forces are exerted on to the said gripping means biasing them towards each other such that in use, said gripping means are held in engagement with said selected structures of the roof edge or trunk lid edge of the vehicle and said slidable tensioning member is held in a fixed position by said ratchet and pawl mechanism.

2. The car rack of claim 1 wherein the tensioning and release means is slideable within the support bar.

3. The car rack of claim 1 wherein a cable is connected to said gripping means.

4. The car rack of claim 3 wherein the cable is operatively connected to the tensioning and release means such that the cable is tensioned by movement of the said tensioning and release means in a selected direction.

5. The car rack of claim 1 wherein the pawls tooth engaging element is movable from a first position such that it engages the toothed ratchet element to a second position where it does not engage the toothed ratchet element causing the release of the biasing forces on the gripping elements.

6. The car rack of claim 1 wherein the elongated ratchet element is fixed inside the support bar.

7. The car rack of claim 4 wherein the cable forms a first loop around a pulley fixed to the tensioning and release means and a second loop around a sheave fixed to the support bar.

* * * * *